(12) United States Patent
Mitsuma

(10) Patent No.: US 12,418,730 B2
(45) Date of Patent: Sep. 16, 2025

(54) IMAGE CAPTURE AND DESIRED TIMING IMAGE RECONSTRUCTION DEVICE, SYSTEM, METHOD, AND NON-TRANSITORY COMPUTER READABLE MEDIUM

(71) Applicant: Sony Semiconductor Solutions Corporation, Kanagawa (JP)

(72) Inventor: Nobutaka Mitsuma, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 27 days.

(21) Appl. No.: 18/256,142

(22) PCT Filed: Dec. 27, 2021

(86) PCT No.: PCT/JP2021/048479
§ 371 (c)(1),
(2) Date: Jun. 6, 2023

(87) PCT Pub. No.: WO2022/153854
PCT Pub. Date: Jul. 21, 2022

(65) Prior Publication Data
US 2024/0040271 A1 Feb. 1, 2024

(30) Foreign Application Priority Data
Jan. 13, 2021 (JP) .................. 2021-003238

(51) Int. Cl.
*H04N 23/951* (2023.01)
*H04N 23/61* (2023.01)
(Continued)

(52) U.S. Cl.
CPC ........... *H04N 23/951* (2023.01); *H04N 23/61* (2023.01); *H04N 23/633* (2023.01); *H04N 25/47* (2023.01)

(58) Field of Classification Search
CPC .... H04N 23/951; H04N 23/61; H04N 23/633; H04N 25/47; A63B 71/06; G03B 15/00
(Continued)

(56) References Cited

U.S. PATENT DOCUMENTS

2004/0199064 A1* 10/2004 Van Liere ............. G06T 11/005
600/407
2010/0077421 A1* 3/2010 Cohen ...................... G07C 9/37
348/370
(Continued)

FOREIGN PATENT DOCUMENTS

| JP | 2017530467 A | 10/2017 |
|---|---|---|
| JP | 2020162000 A | 10/2020 |
| JP | 2020162016 A | 10/2020 |

OTHER PUBLICATIONS

International Search Report (PCT/ISA/210), International Application No. PCT/JP2021/048479, dated Feb. 1, 2022.

*Primary Examiner* — Usman A Khan
(74) *Attorney, Agent, or Firm* — Michael Best & Friedrich LLP

(57) ABSTRACT

An information processing device (10) includes an acquisition unit (121), a recognition unit (122), and an output unit (125). The acquisition unit (121) acquires information in which event data and detection time of the event data are associated with each other, the event data being data output from a first sensor (220) including a pixel array unit (300), which has a plurality of pixels arranged in a two-dimensional lattice pattern, each of the pixels configured to detect a luminance change in incident light and output event data. The recognition unit (122) recognizes the object detected by the first sensor (220) by using a trained model using information related to the detection time and the event data as an input. The output unit (125) outputs an image related to the recognized object.

17 Claims, 12 Drawing Sheets

(51) Int. Cl.
*H04N 23/63* (2023.01)
*H04N 25/47* (2023.01)

(58) Field of Classification Search
USPC .................................................. 348/222.1
See application file for complete search history.

(56) References Cited

U.S. PATENT DOCUMENTS

2022/0161654 A1* 5/2022 Nakagawa ............ A61B 5/1128
2022/0270216 A1* 8/2022 Wang ........................ G06T 5/80

* cited by examiner

IMAGE CAPTURE AND DESIRED TIMING IMAGE RECONSTRUCTION DEVICE, SYSTEM, METHOD, AND NON-TRANSITORY COMPUTER READABLE MEDIUM

FIELD

The present disclosure relates to an information processing device, an information processing system, an information processing method, and a program.

BACKGROUND

There has been proposed an asynchronous solid-state imaging element that performs real-time detection of a luminance change for each pixel as an event in a solid-state imaging device using a complementary metal oxide semiconductor (CMOS) or the like. The solid-state imaging element that detects an event for each pixel like this is also referred to as an event-based vision sensor (EVS).

Furthermore, for example, Patent Literature 1 discloses a technique of generating a frame image based on an event detected by the EVS.

CITATION LIST

Patent Literature

Patent Literature 1: JP 2017-530467 A

SUMMARY

Technical Problem

There is a demand for a technology of clipping and presenting a specific moment from an image obtained by capturing an object moving at a high speed. For example, in sports such as tennis, a system of judging whether a ball landed inside or outside a line is required to capture an image at the moment when a ball moving at a high speed touches the ground.

However, in the case of a frame image created at regular intervals, the frame image does not necessarily include a desired moment. Therefore, it is desirable to present an image of the object at a desired timing to the user.

In view of this, the present disclosure provides a mechanism capable of presenting an image of an object at a desired timing to a user.

Note that the above problem or target is merely one of a plurality of problems or targets that can be solved or achieved by a plurality of embodiments disclosed in the present specification.

Solution to Problem

According to the present disclosure, an information processing apparatus is provided. The information processing device includes an acquisition unit, a recognition unit, and an output unit. The acquisition unit acquires information in which event data and detection time of the event data are associated with each other, the event data being data output from a first sensor including a pixel array unit, which has a plurality of pixels arranged in a two-dimensional lattice pattern, each of the pixels configured to detect a luminance change in incident light and output event data. The recognition unit recognizes the object detected by the first sensor by using a trained model using information related to the detection time and the event data as an input. The output unit outputs an image related to the recognized object.

DESCRIPTION OF EMBODIMENTS

Figure 1:
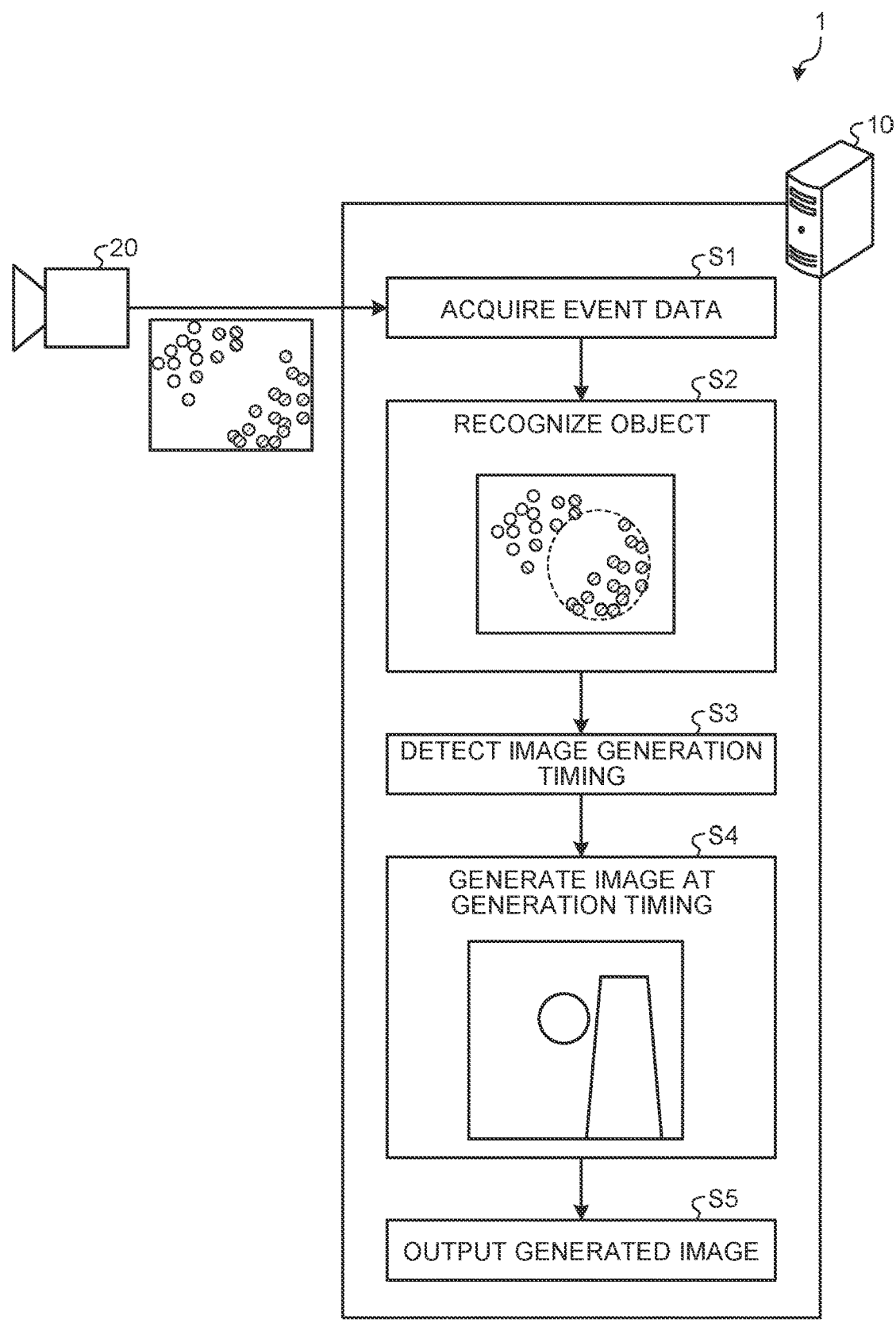
FIG. 1 is a diagram illustrating an overview of information processing according to an embodiment of the present disclosure.

Hereinafter, embodiments of the present disclosure will be described in detail with reference to the accompanying drawings. Note that redundant descriptions will be omitted from the present specification and the drawings by assigning the same reference signs to components having substantially the same functional configuration.

Furthermore, in the present specification and the drawings, similar components in the embodiments may be distinguished by adding different alphabets after the same reference numerals. However, when there is no need to particularly distinguish similar components from each other, only the same reference numeral is assigned.

One or more embodiments (examples and modifications) described below can each be implemented independently. On the other hand, at least some of the plurality of embodiments described below may be appropriately combined with at least some of other embodiments. The plurality of embodiments may include novel features different from each other. Accordingly, the plurality of embodiments can contribute to achieving or solving different objects or problems, and can exhibit different effects.

Note that the description will be provided in the following order.

1. Introduction
1.1. Background
1.2. Proposed Technology
2. Information processing system
2.1. Configuration example of detection device
2.1.1. Configuration example of EVS
2.1.2. Configuration example of unit pixel
2.1.3. Configuration example of address event detection unit
2.1.4. Configuration example of current-voltage conversion unit
2.1.5. Configuration example of subtractor and quantizer
2.2. Configuration example of control device
3. Information processing
3.1. Setting processing
3.2. Imaging processing
3.3. Generation processing
4. Other embodiments
5. Hardware configuration
6. Summary

1. Introduction

<1.1. Background>

Conventionally, a high-speed camera has been used to capture a video at a desired imaging timing (hereinafter, also referred to as a decisive moment) such as a hitting moment of a high-speed object. The high-speed camera can capture a video (frame) at a rate of one several hundredth to several thousandth of a second, for example. For example, by analyzing an image captured by the high-speed camera, the information processing device presents the image at the decisive moment to the user.

Here is a case to be considered in which the above-described high-speed camera captures a video at a decisive moment such as a moment when the ball touches the ground in a sport in which the ball moves at a high speed, such as tennis.

For example, in the case of tennis, the initial speed of a serve can exceed 240 km/h. In addition, the speed of the ball is close to 140 km/h (47.2 m/sec) even at a point where the ball touches the court. For example, when a ball is captured by a camera that performs imaging at 350 fps, the ball moves 135 mm between the frames. Even when the camera images the ball at 2500 fps, the ball moves 18.9 mm between the frames.

Therefore, when an object (for example, a ball) moving at a high speed is imaged by a camera with a low frame rate, there is a high possibility that a decisive moment (for example, a moment when the ball touches the ground) occurs between the frames. In this case, there is a high possibility that the camera with a low frame rate cannot capture an image at the decisive moment.

On the other hand, increasing the frame rate increases the possibility that the camera captures an image at the decisive moment. However, increasing the frame rate would increase the number of captured images, leading to a dramatically increase in data volume. This would cause problems such as an increase in cost of a storage that stores captured images and an increase in processing load of analyzing the captured images.

In a system used for video judgment in a tennis challenge system, ten or more 350 fps cameras are combined to track the trajectory of a ball, reconstructs a moment at which the ball touches the ground by computer graphics (CG) and presents the reconstructed image to a user. Alternatively, a system that presents an actual captured image to a user by using 40 or more 2500 fps cameras is also known. In such a system, the actual captured image is presented to the user to make the video judgment more convincing.

Meanwhile, an EVS is known to perform real-time detection of a luminance change for each pixel as an event. The EVS captures a change in luminance in units of 1 μSec at maximum. The EVS is an asynchronous solid-state imaging element, and has no concept of a frame used in a synchronous solid-state imaging element. However, even in a case where the rate is converted into a frame, the EVS can detect an object with time resolution higher than that of a general high-speed camera. In addition, since the EVS detects the luminance change, the data volume of the event data can be suppressed. Moreover, it is possible to suppress an increase in the cost of storage that stores event data and an increase in the processing load for analyzing the event data.

However, the event data output from the EVS is data indicating a luminance change, and thus, needs to be converted into an image that can be recognized by the user.

To handle this, the proposed technology of the present disclosure provides a mechanism of presenting a video of a decisive moment to the user using event data output from the EVS.

<1.2. Proposed Technology>

FIG. 1 is a diagram illustrating an overview of information processing according to an embodiment of the present disclosure. Information processing according to the technology of the present disclosure is executed by an information processing system 1. The information processing system 1 includes a control device 10 and a detection device 20.

Although the following will describe a case where the information processing system 1 is a system that presents the timing at which a tennis ball touched the ground to the user, the video to be presented by the information processing system 1 is not limited thereto.

The detection device 20 includes an EVS (an example of a first sensor) that performs real-time detection of a luminance change for each pixel as an event, and outputs the detected event data and the detection time to the control device 10 in association with each other.

The control device 10 is an information processing device that controls the detection device 20 and presents a video at a desired timing to the user based on the event data acquired from the detection device 20.

The control device 10 acquires event data from the detection device 20 (Step S1). As illustrated in FIG. 1, the event data includes data indicating that the luminance change exceeds a predetermined threshold (positive event) and data indicating that the luminance change falls below the predetermined threshold (negative event).

In this manner, the event data output by the detection device 20 is data indicating the luminance change of each pixel, and is displayed as a simple point group when displayed as an image, making it difficult for the user to recognize the object in some cases.

To handle this, the control device 10 according to the embodiment of the present disclosure recognizes an object (subject) detected by the detection device 20 using machine learning using event data and a detection time as an input (Step S2). In an example of FIG. 1, the control device 10 recognizes that the subject is a ball and detects the position of the ball on the screen. For example, the control device 10 may detect a motion vector of the ball together with the position of the ball.

Next, based on the recognition result, the control device 10 detects a generation timing of an image to be presented to the user (Step S3). Here, the control device 10 detects, as the generation timing, a timing at which a ball being a subject touched the ground. Details of detection of the generation timing will be described below.

The control device 10 generates an image at the detected generation timing (Step S4). The control device 10 generates, for example, an output image including a ball that touched the ground and a line drawn on the ground. The control device 10 can generate an output image by combining a ball image with a background image captured by an image sensor (not illustrated). Furthermore, the control device 10 may generate a moving image of a constant period including the generation timing, as the output image.

The control device 10 outputs the generated image to a display device (not illustrated) (Step S5). With this operation, the control device 10 presents the video at a desired timing to the user.

As described above, the information processing system 1 according to the embodiment of the present disclosure detects information related to the subject based on the data output by the EVS. The information processing system 1 generates and outputs a video at a desired timing based on information regarding the detected subject.

Since the EVS has no concept of frames, the information processing system 1 can generate an image based on event data at any timing. This makes it possible for the information processing system 1 to present a video at a desired timing to the user.

In addition, the small data volume generated by the EVS leads to saving of the storage, making it possible to suppress an increase in the processing load of data analysis performed by the control device 10. This makes it possible for the control device 10 to generate an image in a shorter time and present the generated image to the user.

Furthermore, the control device 10 generates the output image based on the output data of the EVS, making it possible for the information processing system 1 to present an image having a higher visibility for the user.

2. Information Processing System

Figure 2:
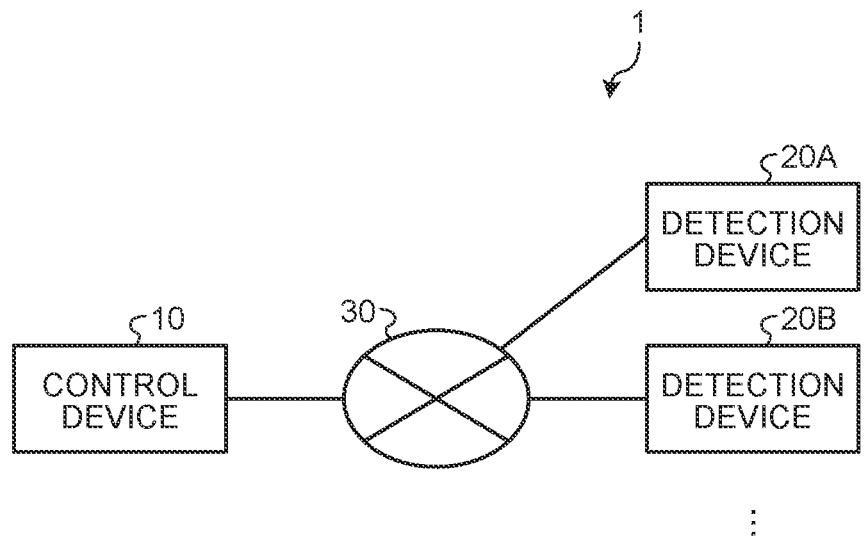
FIG. 2 is a block diagram illustrating a configuration example of an information processing system according to the embodiment of the present disclosure.

FIG. 2 is a block diagram illustrating a configuration example of the information processing system 1 according to the embodiment of the present disclosure. The information processing system 1 illustrated in FIG. 2 includes a control device 10 and a plurality of detection devices 20A, 20B, . . . . The control device 10 and the plurality of detection devices 20 are connected to each other via a network 30.

<2.1. Configuration Example of Detection Device>

The detection device 20 includes a plurality of sensors that detect a subject. The detection device 20 is disposed on a tennis court in order to capture a timing at which a tennis ball touches the ground, for example.

Figure 3:
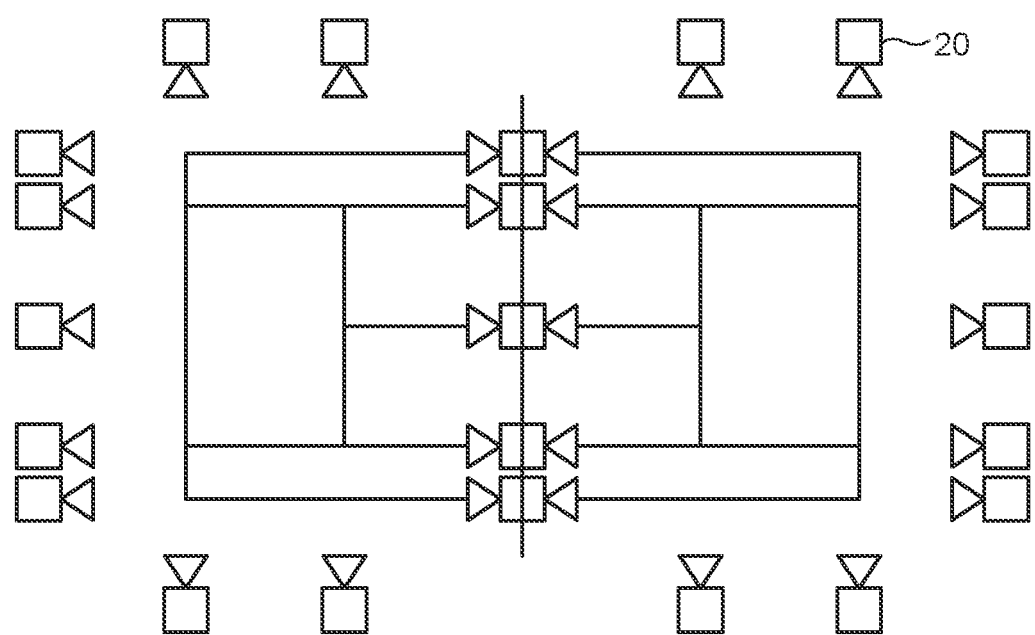
FIG. 3 is a diagram illustrating an arrangement example of a detection device according to the embodiment of the present disclosure.

FIG. 3 is a diagram illustrating an arrangement example of the detection device 20 according to the embodiment of the present disclosure. As illustrated in FIG. 3, the plurality of detection devices 20 is arranged along lines of a tennis court so as to image the lines. At this time, the plurality of (two in FIG. 3) detection devices 20 having different imaging directions are arranged for one line. With this arrangement, even when the ball is hidden by a player or the like from one detection device 20, for example, the ball can be imaged by the other detection device 20. By arranging the plurality of detection devices 20 for one line in this manner, the detection device 20 can detect the ball with higher reliability.

Figure 4:
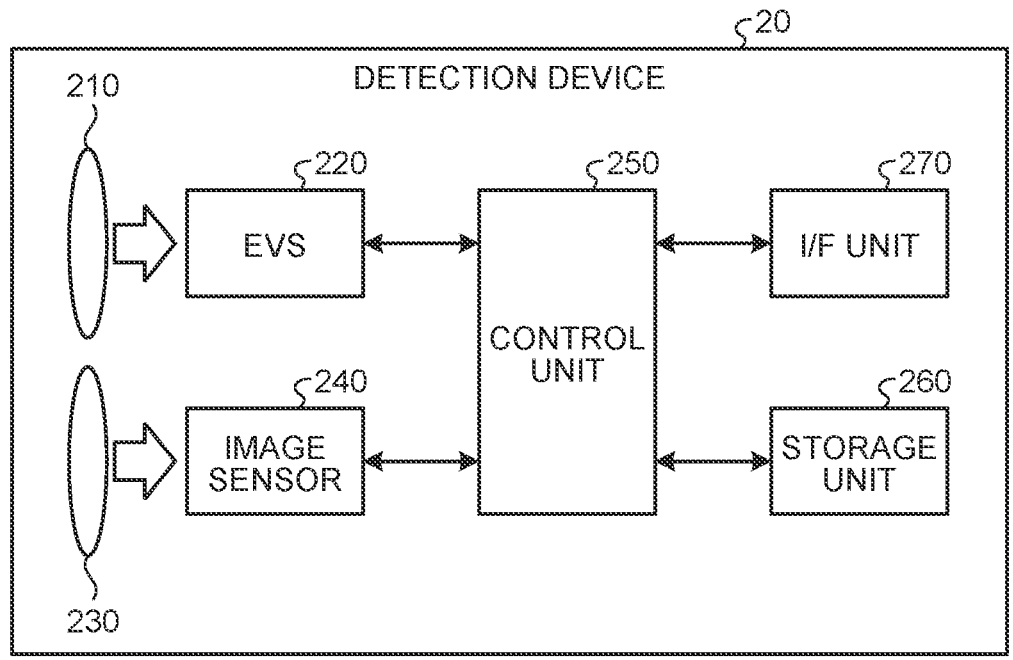
FIG. 4 is a block diagram illustrating a configuration example of the detection device according to the embodiment of the present disclosure.

FIG. 4 is a block diagram illustrating a configuration example of the detection device 20 according to the embodiment of the present disclosure. As illustrated in FIG. 4, the detection device 20 includes an imaging lens 210, an EVS 220, an imaging lens 230, an image sensor 240, a control unit 250, a storage unit 260, and an I/F unit 270, for example.

(Imaging Lens 210)

The imaging lens 210 is an example of an optical system that collects incident light and forms an optical image based on the light on a light receiving surface of the EVS 220. The light receiving surface may be a surface on which photoelectric conversion elements are arranged in the EVS 220.

(EVS 220)

The EVS 220 is the first sensor that detects an object (subject) present in a detection range of the detection device 20. The EVS 220 is an asynchronous image sensor in which a detection circuit is provided for each pixel. The detection circuit is configured to performs real-time detection of an event that the light reception amount exceeds a threshold as an address event.

A typical EVS adopts a driving system referred to as event-driven driving system. In this system, the presence or absence of occurrence of an address event is detected for each unit pixel, and when the occurrence of the address event has been detected, a pixel signal is read from the unit pixel in which the address event has occurred.

Furthermore, a typical EVS executes a read operation for the unit pixel in which the occurrence of the address event is detected. Accordingly, the EVS is characterized by the capability of performing reading at a much higher speed than that in a synchronous image sensor in which the read operation is executed for all the unit pixels, and characterized by the small volume of data to be read.

Note that a unit pixel in the present description is a minimum unit of a pixel including one photoelectric conversion element (also referred to as a light receiving element), and corresponds to each dot in image data read from an image sensor, for example. Furthermore, an address event is an event that occurs for each address assigned to each of the plurality of unit pixels arranged in a two-dimensional lattice pattern, and corresponds to an event that a value of a current (hereinafter, referred to as photocurrent) based on a charge generated in the photoelectric conversion element or a change amount thereof exceeds a certain threshold.

In the present embodiment, the EVS 220 detects an occurrence of an address event based on the amount of incident light, and generates, as event data, address information for specifying the unit pixel in which the occurrence of the address event has been detected. The event data is output in association with time information such as a time stamp indicating the timing at which the occurrence of the address event is detected. The combination of the event data and the time information is also referred to as event detection data. The generated event detection data is input to the control unit 250.

(Imaging Lens 230)

Similarly to the imaging lens 210, the imaging lens 230 is an example of an optical system that collects incident light and forms an image of the condensed light on a light receiving surface of the image sensor 240. The light receiving surface may be a surface on which the photoelectric conversion elements in the image sensor 240 are arranged.

(Image Sensor 240)

The image sensor 240 may be, for example, various image sensors capable of acquiring image data, such as a charge coupled device (CCD) image sensor or a complementary metal-oxide-semiconductor (CMOS) image sensor. The image data acquired by the image sensor 240 is individually input to the control unit 250.

Note that the EVS 220 and the image sensor 240 may be arranged close to each other in the same direction so as to capture substantially the same angle of view, for example.

(Control Unit 250)

The control unit 250 controls individual portions of the detection device 20. The control unit 250 controls the EVS 220 to acquire event data. The control unit 250 stores the acquired event data in the storage unit 260.

The control unit 250 controls the image sensor 240 to acquire image data. The control unit 250 stores the acquired image data in the storage unit 260.

(Storage Unit 260)

The storage unit 260 is storage that stores event data output from the EVS 220 and image data output from the image sensor 240. The storage unit 260 may be an external device of the detection device 20.

(I/F Unit 270)

The I/F unit 270 is, for example, an interface for transmitting and receiving data to and from an external device via the network 30 (refer to FIG. 2).

<2.1.1. Configuration Example of EVS>

Figure 5:
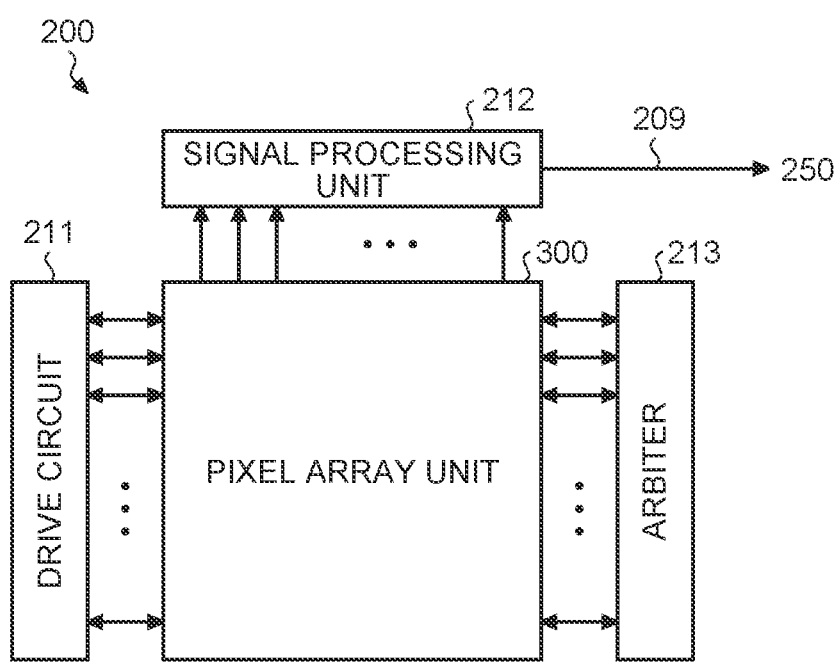
FIG. 5 is a block diagram illustrating a functional configuration example of the EVS according to the embodiment of the present disclosure.

Next, a configuration example of the EVS 220 will be described in detail with reference to the drawings. FIG. 5 is a block diagram illustrating a functional configuration example of the EVS 220 according to the embodiment of the present disclosure. As illustrated in FIG. 5, the EVS 220 includes a drive circuit 211, a signal processing unit 212, an arbiter 213, and a pixel array unit 300.

The pixel array unit 300 includes a plurality of unit pixels arranged in a two-dimensional lattice pattern. As will be described in detail below, the unit pixel includes, for example: a photoelectric conversion element such as a photodiode; and a pixel circuit (in the present embodiment, the pixel circuit corresponds to an address event detection unit 400 described below) that detects the presence or absence of occurrence of an address event based on whether a current value of a photocurrent due to a charge generated in the photoelectric conversion element or a change amount thereof exceeds a predetermined threshold. Here, the pixel circuit can be shared by a plurality of photoelectric conversion elements. In that case, each unit pixel includes one photoelectric conversion element and a shared pixel circuit.

The plurality of unit pixels of the pixel array unit 300 may be grouped into a plurality of pixel blocks each including a predetermined number of unit pixels. Hereinafter, a set of unit pixels or pixel blocks arranged in the horizontal direction is referred to as a "row", and a set of unit pixels or pixel blocks arranged in a direction perpendicular to the row is referred to as a "column".

When occurrence of an address event is detected in the pixel circuit, each unit pixel outputs, to the arbiter 213, a request for reading a signal from the unit pixel.

The arbiter 213 arbitrates a request from one or more unit pixels, and transmits a predetermined response to the unit pixel that has issued the request based on a result of the arbitration. The unit pixel that has received this response outputs a detection signal indicating occurrence of an address event to the drive circuit 211 and the signal processing unit 212.

The drive circuit 211 sequentially drives the unit pixel that has output the detection signal, thereby allowing a signal corresponding to the amount of received light to be output from the unit pixel in which the occurrence of the address event has been detected to the signal processing unit 212. The EVS 220 may have, for example, an analog-to-digital converter for converting a signal read from a photoelectric conversion element 333 to be described below into a signal of a digital value according to the charge amount, provided for each of one or a plurality of unit pixels or columns.

The signal processing unit 212 performs predetermined signal processing on the signal input from the unit pixel, and supplies a result of the signal processing to the control unit 250 via the signal line 209 as event detection data. The event detection data can include the address information of the unit pixel in which the occurrence of the address event has been detected as described above, and time information (detection time information) such as a time stamp indicating an address event occurrence timing.

<2.1.2. Configuration Example of Unit Pixel>

Figure 6:
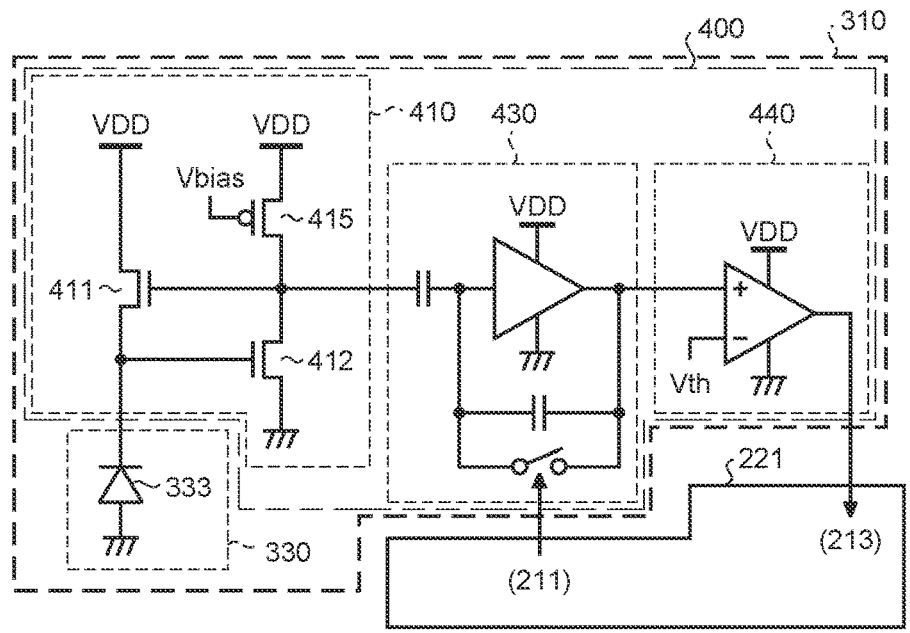
FIG. 6 is a circuit diagram illustrating a schematic configuration example of a unit pixel according to the embodiment of the present disclosure.

Next, a configuration example of an unit pixel 310 will be described. FIG. 6 is a circuit diagram illustrating a schematic configuration example of the unit pixel 310 according to the embodiment of the present disclosure. As illustrated in FIG. 6, the unit pixel 310 includes, for example, a light receiving unit 330 and an address event detection unit 400. Note that a logic circuit 221 in FIG. 6 may be, for example, a logic circuit constituting the control unit 250 in FIG. 4.

The light receiving unit 330 includes, for example, a photoelectric conversion element 333 such as a photodiode, and has its output connected to the address event detection unit 400.

The address event detection unit 400 includes, for example, a current-voltage conversion unit 410 and a subtractor 430. However, the address event detection unit 400 further includes a buffer, a quantizer, and a transfer unit. Details of the address event detection unit 400 will be described below with reference to FIG. 7 and the like.

In such a configuration, the photoelectric conversion element 333 of the light receiving unit 330 performs photoelectric conversion on the incident light to generate a charge. The charge generated in the photoelectric conversion element 333 is input to the address event detection unit 400 as a photocurrent of a current value corresponding to the charge amount.

<2.1.3. Configuration Example of Address Event Detection Unit>

Figure 7:
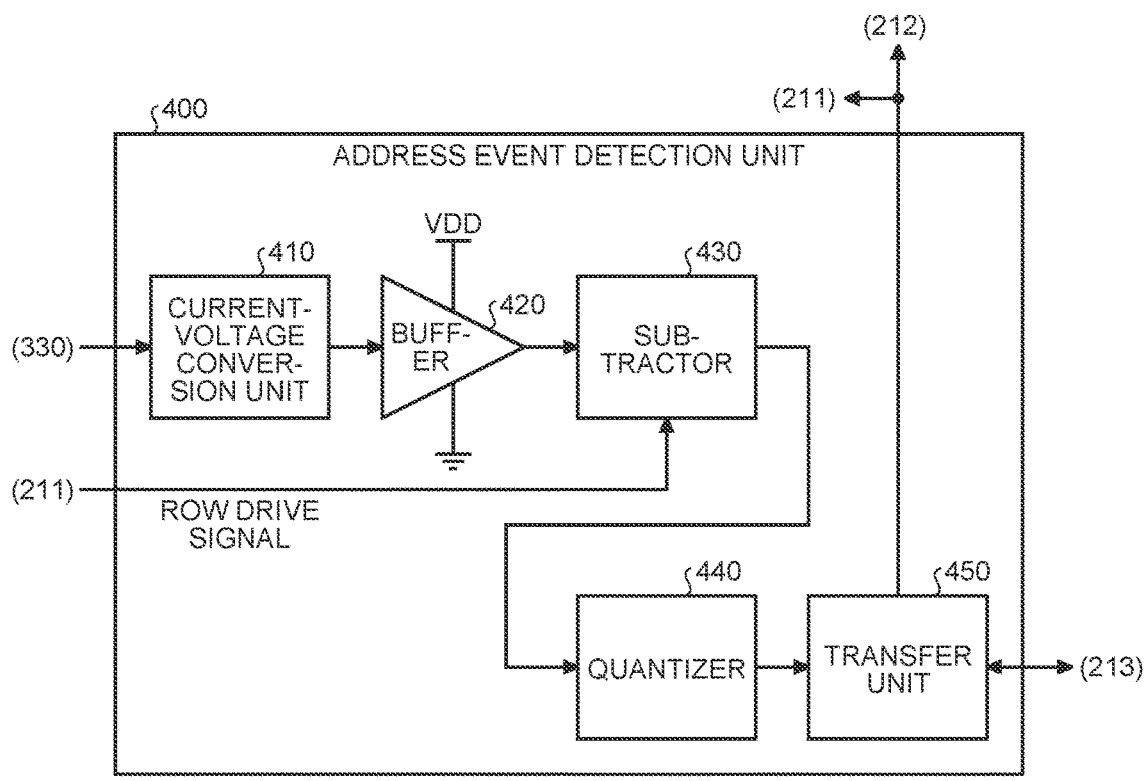
FIG. 7 is a block diagram illustrating a schematic configuration example of an address event detection unit according to the embodiment of the present disclosure.

FIG. 7 is a block diagram illustrating a schematic configuration example of the address event detection unit 400 according to the embodiment of the present disclosure. As illustrated in FIG. 7, the address event detection unit 400 includes a buffer 420 and a transfer unit 450 in addition to the current-voltage conversion unit 410, the subtractor 430, and a quantizer 440 illustrated in FIG. 6 as well.

The current-voltage conversion unit 410 converts the photocurrent from the light receiving unit 330 into a logarithmic voltage signal, and outputs the voltage signal generated by the conversion to the buffer 420.

The buffer 420 corrects the voltage signal from the current-voltage conversion unit 410 and outputs the corrected voltage signal to the subtractor 430.

The subtractor 430 lowers the voltage level of the voltage signal from the buffer 420 according to the row drive signal from the drive circuit 211, and outputs the lowered voltage signal to the quantizer 440.

The quantizer 440 quantizes the voltage signal from the subtractor 430 into a digital signal, and outputs the digital signal generated by the quantization to the transfer unit 450 as a detection signal.

The transfer unit 450 transfers the detection signal from the quantizer 440 to the signal processing unit 212 and the like. For example, when occurrence of an address event is detected, the transfer unit 450 outputs, to the arbiter 213, a request for transmission of a detection signal of the address event from the transfer unit 450 to the drive circuit 211 and the signal processing unit 212. Having received a response to the request from the arbiter 213, the transfer unit 450 outputs a detection signal to the drive circuit 211 and the signal processing unit 212.

<2.1.4. Configuration Example of Current-Voltage Conversion Unit>

Figure 8:
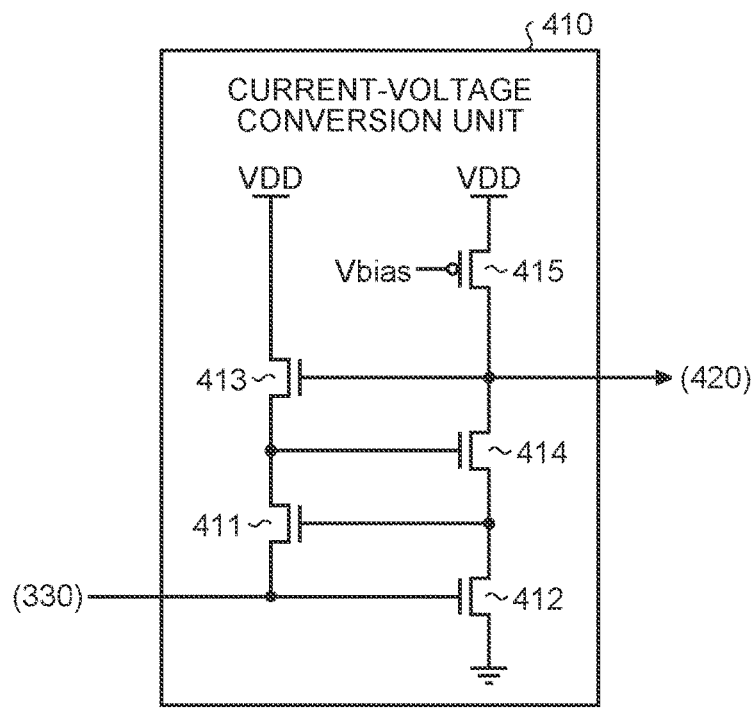
FIG. 8 is a circuit diagram illustrating another example of a current-voltage conversion unit according to the embodiment of the present disclosure.

The current-voltage conversion unit 410 in the configuration illustrated in FIG. 7 may be, for example, a converter referred to as a source-follower current-voltage conversion unit including an LG transistor 411, an amplification transistor 412, and a constant current circuit 415 as illustrated in FIG. 6. However, the converter is not limited thereto, and for example, as illustrated in FIG. 8, it is also allowable to use a converter referred to as a gain boost current-voltage converter including two LG transistors 411 and 413, two amplification transistors 412 and 414, and a constant current circuit 415. FIG. 8 is a circuit diagram illustrating another example of the current-voltage conversion unit 410 according to the embodiment of the present disclosure.

As illustrated in FIG. 6, the source of the LG transistor 411 and the gate of the amplification transistor 412 are connected to the cathode of the photoelectric conversion element 333 of the light receiving unit 330, for example. The drain of the LG transistor 411 is connected to a power supply terminal VDD, for example.

Furthermore, for example, the amplification transistor 412 has its source grounded and has its drain connected to the power supply terminal VDD via the constant current circuit 415. The constant current circuit 415 may include, for example, a load metal-oxide-semiconductor (MOS) transistor such as a P-type MOS transistor.

In contrast, when using a gain boost type unit, as illustrated in FIG. 8, the source of the LG transistor 411 and the gate of the amplification transistor 412 are connected to the cathode of the photoelectric conversion element 333 of the light receiving unit 330, for example. Furthermore, the drain of the LG transistor 411 is connected to the source of the LG transistor 413 and the gate of the amplification transistor 412, for example. The drain of the LG transistor 413 is connected to the power supply terminal VDD, for example.

Furthermore, for example, the source of the amplification transistor 414 is connected to the gate of the LG transistor 411 and the drain of the amplification transistor 412. The drain of the amplification transistor 414 is connected to the power supply terminal VDD via the constant current circuit 415, for example.

The use of the connection relationship illustrated in FIG. 6 or 8 leads to a configuration of a loop-shaped source follower circuit. With this configuration, the photocurrent from the light receiving unit 330 is converted into a logarithmic voltage signal corresponding to the charge amount. Note that each of the LG transistors 411 and 413 and the amplification transistors 412 and 414 may include an NMOS transistor, for example.

<2.1.5. Configuration Example of Subtractor and Quantizer>

Figure 9:
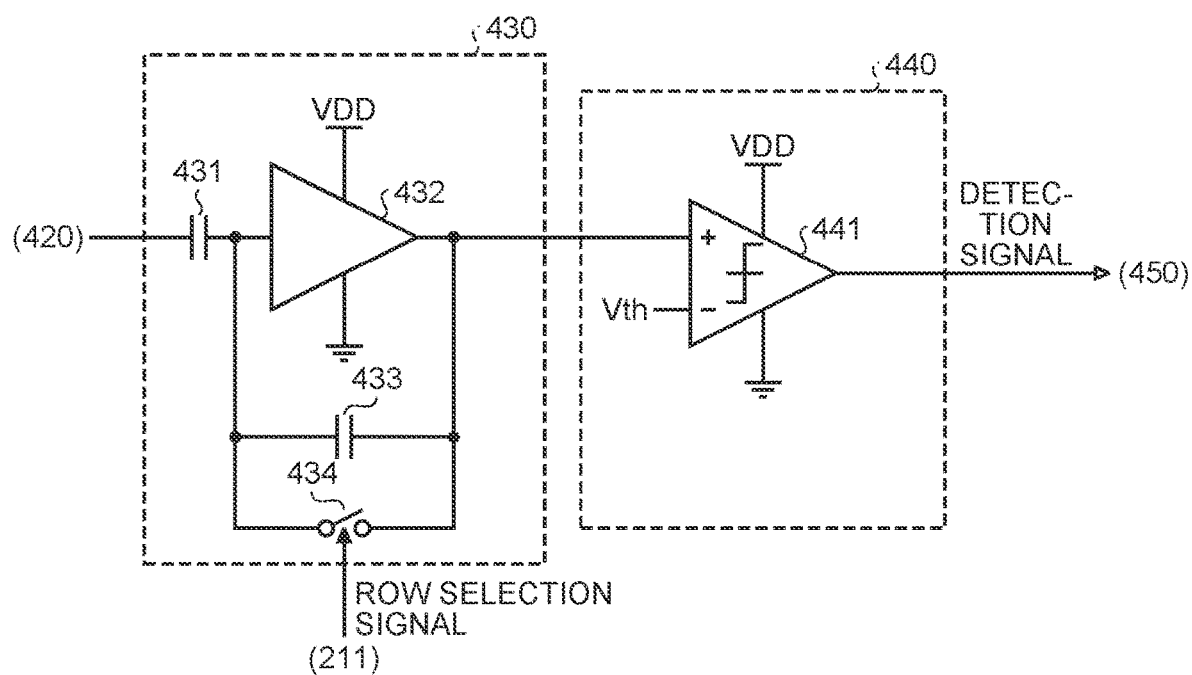
FIG. 9 is a circuit diagram illustrating a schematic configuration example of a subtractor and a quantizer according to the embodiment of the present disclosure.

FIG. 9 is a circuit diagram illustrating a schematic configuration example of the subtractor 430 and the quantizer 440 according to the embodiment of the present disclosure. As illustrated in FIG. 9, the subtractor 430 includes capacitors 431 and 433, an inverter 432, and a switch 434. Furthermore, the quantizer 440 includes a comparator 441.

The capacitor 431 has one end connected to an output terminal of the buffer 420 and the other end connected to an input terminal of the inverter 432. The capacitor 433 is connected in parallel to the inverter 432. The switch 434 opens and closes a path connecting both ends of the capacitor 433 according to the row drive signal.

The inverter 432 inverts the voltage signal input through the capacitor 431. The inverter 432 outputs the inverted signal to a non-inverting input terminal (+) of the comparator 441.

When the switch 434 is turned on, a voltage signal Vinit is input to the buffer 420 side of the capacitor 431. The opposite side works as a virtual ground terminal. The potential of the virtual ground terminal is assumed to be zero for convenience. At this time, when the capacitance of the capacitor 431 is C1, a potential Qinit accumulated in the capacitor 431 is expressed by the following Formula (1). On the other hand, since both ends of the capacitor 433 are short-circuited, the accumulated charge is 0.

$$Q_{init} = C1 \times V_{init} \tag{1}$$

Next, in an assumed case where the switch 434 is turned off and the voltage on the buffer 420 side of the capacitor 431 has changed to a voltage Vafter, charge Qafter accumulated in the capacitor 431 is expressed by the following Formula (2).

$$Q_{after} = C1 \times V_{after} \tag{2}$$

On the other hand, when the output voltage is Vout, the charge Q2 accumulated in the capacitor 433 is expressed by the following Formula (3).

$$Q2 = C2 \times V_{out} \tag{3}$$

At this time, since the total charge amounts of the capacitors 431 and 433 do not change, the following Formula (4) holds.

$$Q_{init} = Q_{after} + Q2 \tag{4}$$

When Formulas (1) to (3) are substituted into Formula (4), then the result can be transformed into the following Formula (5).

$$Vout = -(C1/C2) \times (Vafter - Vinit) \quad (5)$$

Formula (5) represents a subtraction operation of the voltage signals, in which the gain for the subtraction result is C1/C2. Since maximized gain is desirable in usual cases, it is preferable to design C1 to be large and C2 to be small. On the other hand, excessively small C2 would increase kTC noise and cause deterioration in noise characteristics. Therefore, capacity reduction of C2 is limited to a noise tolerable range. In addition, since the address event detection unit 400 including the subtractor 430 is mounted in each unit pixel, the capacitances C1 and C2 have area restrictions. In consideration of these, the values of the capacitances C1 and C2 are determined.

The comparator 441 compares the voltage signal from the subtractor 430 with a predetermined threshold voltage Vth applied to the inverting input terminal (−). The comparator 441 outputs a signal indicating the comparison result to the transfer unit 450 as a detection signal.

Furthermore, when the conversion gain of the current-voltage conversion unit 410 is $CG_{log}$ and the gain of the buffer 420 is '1', gain A of the entire address event detection unit 400 is expressed by the following Formula (6).

$$A = \frac{CG_{log} \cdot C1}{C2} \sum_{n=1}^{N} i_{photo\_n} \quad (6)$$

In Formula (6), $i_{photo\_n}$ is the photocurrent of the nth unit pixel, having a unit of ampere (A), for example. N is the number of unit pixels 310 in the pixel block, and is '1' in the present embodiment.

<2.2. Configuration Example of Control Device>

Returning to FIG. 2. As described above, the information processing system 1 includes the control device 10. The control device 10 is an information processing device that controls the detection device 20 and generates an image to be presented to the user.

Figure 10:
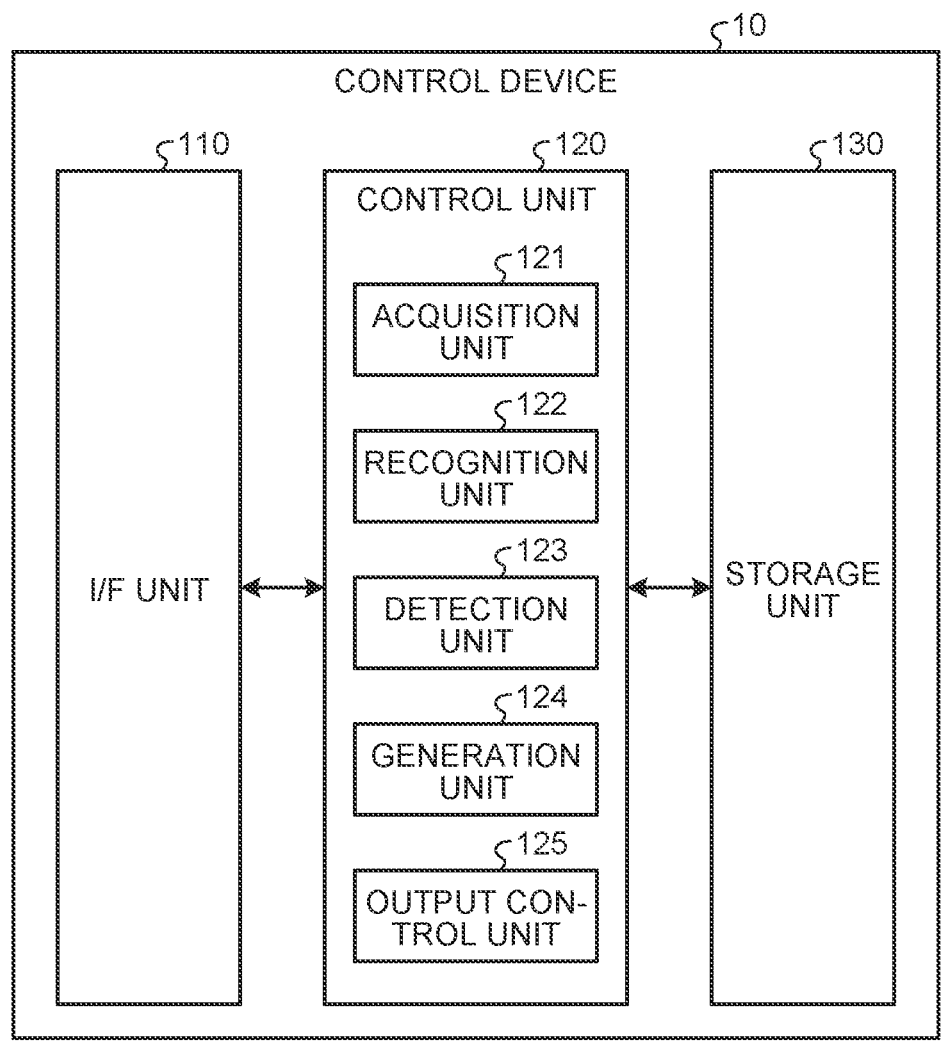
FIG. 10 is a block diagram illustrating a configuration example of a control device according to the embodiment of the present disclosure.

FIG. 10 is a block diagram illustrating a configuration example of the control device 10 according to the embodiment of the present disclosure. As illustrated in FIG. 10, the control device 10 includes an I/F unit 110, a control unit 120, and a storage unit 130.

(I/F Unit 110)

The I/F unit 110 is, for example, an interface for transmitting and receiving data to and from the detection device 20 via the network 30 (refer to FIG. 2).

(Storage Unit 130)

The storage unit 130 is a storage device that stores various programs and data necessary for information processing performed by the control unit 120.

(Control Unit 120)

The control unit 120 is implemented by execution of programs stored inside the control device 10 by a central processing unit (CPU), a micro processing unit (MPU), or the like, using random access memory (RAM) or the like, as a working area. Furthermore, the control unit 120 is actualized by, for example, an integrated circuit such as an application specific integrated circuit (ASIC) or a field programmable gate array (FPGA).

As illustrated in FIG. 10, the control unit 120 includes an acquisition unit 121, a recognition unit 122, a detection unit 123, a generation unit 124, and an output control unit 125, and implements or executes a function and an action of information processing described below. The internal configuration of the control unit 120 is not limited to the configuration illustrated in FIG. 10, and may be any other configuration as long as it is a configuration that performs information processing described below. Furthermore, each configuration included in the control unit 120 may be implemented as a separate device.

(Acquisition Unit 121)

The acquisition unit 121 acquires data from the detection device 20 based on an instruction from the user. The instruction from the user can be acquired from an input device (not illustrated) connected via the I/F unit 110. As described above, in a case where the information processing system 1 according to the embodiment of the present disclosure is used for video judgment in tennis, the user designates the detection device 20 to be subjected to the video judgment and a period in which the judgment is to be performed. The user may designate a period in which judgment is performed, and may designate at least one of a start time and an end time of the period.

The acquisition unit 121 acquires data of a period designated by the user from the detection device 20 designated by the user. In a case where the user designates one of the start time and the end time, the acquisition unit 121 acquires data of a certain period from the designated time. The data acquired from the detection device 20 can include event detection data and image data of the predetermined period.

Figure 11:
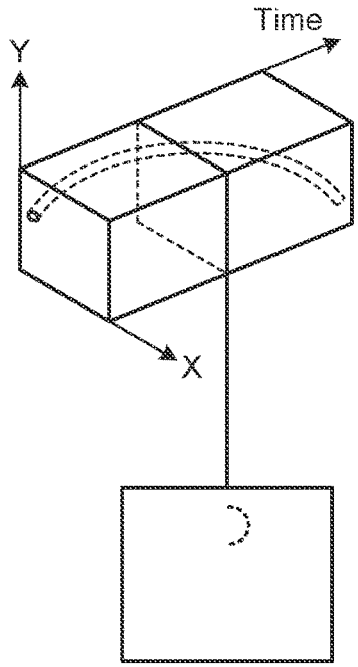
FIG. 11 is a diagram illustrating an example of event detection data acquired by an acquisition unit according to the embodiment of the present disclosure.
Figure 12:
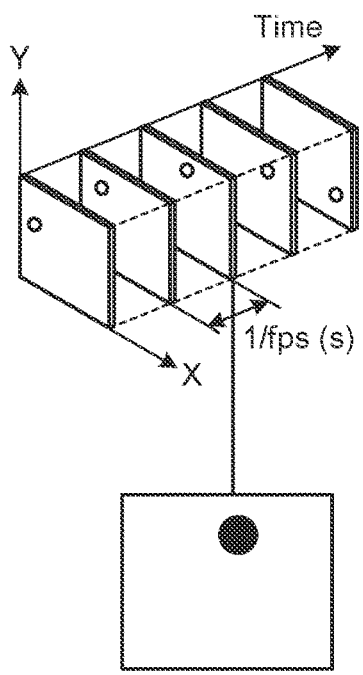
FIG. 12 is a diagram illustrating an example of image data acquired by an acquisition unit according to the embodiment of the present disclosure.

FIG. 11 is a diagram illustrating an example of event detection data acquired by the acquisition unit 121 according to the embodiment of the present disclosure. FIG. 12 is a diagram illustrating an example of image data acquired by the acquisition unit 121 according to the embodiment of the present disclosure.

As described above, the event detection data includes address information for specifying the unit pixel in which the occurrence of the address event is detected. Therefore, as illustrated in FIG. 11, the event detection data in the predetermined period is represented as a point group representing a continuous change in luminance. In addition, when data at time t10, being a certain time, is acquired, the acquired data is represented as a group of points representing the luminance change.

On the other hand, the image data is image data captured at a predetermined frame rate (fps). Accordingly, as illustrated in FIG. 12, the acquisition unit 121 acquires a plurality of pieces of image data captured at a constant cycle (1/fps) in a predetermined period. The image data acquired by the acquisition unit 121 as the image data at time t20 is general image data, including an image that enables the user to easily recognize an object which is a subject. In addition, since the image data is acquired at a predetermined frame rate, the acquisition unit 230 acquires the image data at a timing of a certain cycle, but does not acquire the image data between the cycle (between the frames). Therefore, in a case where the timing at which the ball touched the ground is between the frames, the acquisition unit 230 cannot acquire the image data in which the ball is landing on the ground.

In accordance with an instruction from the detection unit 123 to be described below, the acquisition unit 121 outputs, from among the acquired event detection data, event detection data for a constant period having a time designated by the detection unit 123 as an end time to the recognition unit 122. In addition, the acquisition unit 121 outputs the acquired image data to the generation unit 124.

(Recognition Unit 122)

The recognition unit 122 recognizes the subject detected by the detection device 20 based on the event detection data input from the acquisition unit 121. For example, the recognition unit 122 recognizes the subject using a trained model generated based on machine learning, such as deep neural network (DNN).

The recognition unit 122 recognizes the subject using the trained model using information regarding the event detection data as an input. As described above, the event detection data includes the address information for specifying the unit pixel in which the occurrence of the address event is detected, and the time information indicating the detection timing. In addition, the event detection data includes event type information indicating whether the detected event is a positive event or a negative event.

The recognition unit 122 uses the trained model using the address information, the time information, and the event type information as an input to acquire information to be used for generation of an output image to be described below, such as a position, contour, a shape, a state, a speed, and a motion vector of the subject. Furthermore, the recognition unit 122 recognizes whether the subject is an object as a detection target (here, a ball).

The recognition unit 122 may use the address information, the time information, and the event type information as input variables of the trained model, but for example, may generate image data (an example of an input image) based on the address information, the time information, and the event type information, and use the generated image data as an input to the trained model.

Figure 13:
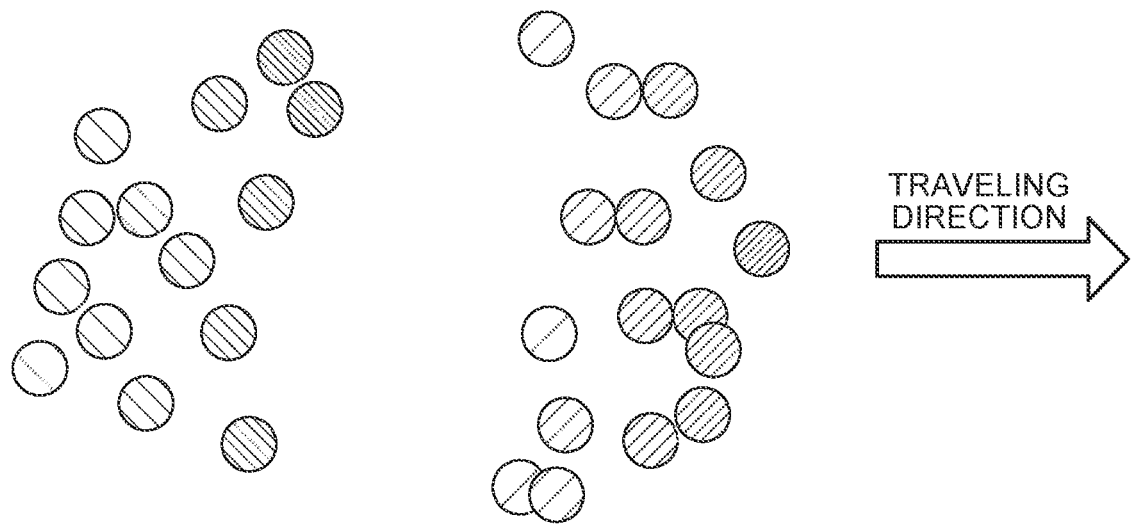
FIG. 13 is a diagram illustrating an example of image data generated by a recognition unit according to the embodiment of the present disclosure.
Figure 14:
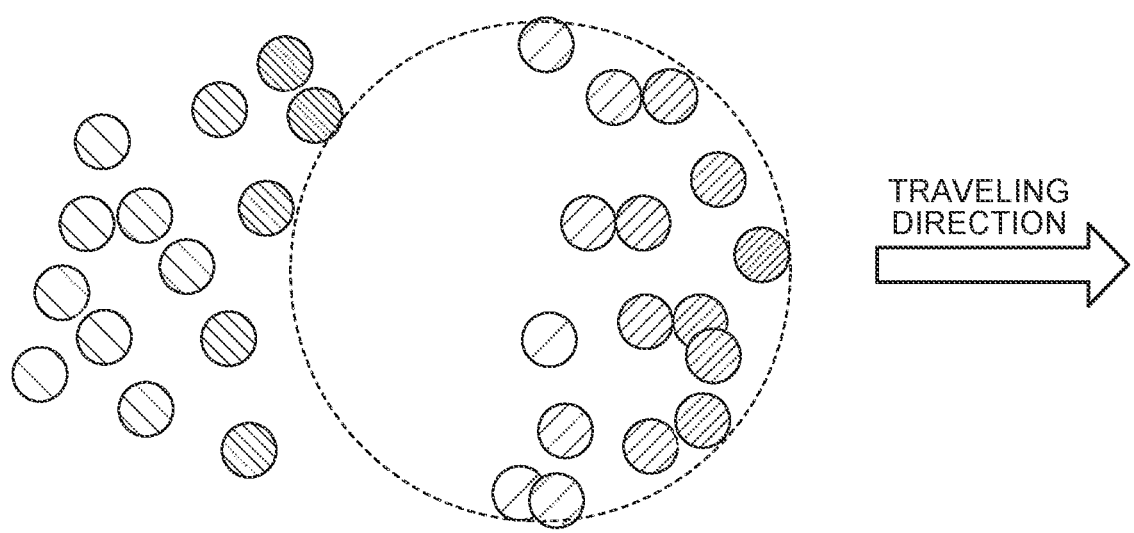
FIG. 14 is a diagram illustrating a recognition result obtained by the recognition unit according to the embodiment of the present disclosure.

FIG. 13 is a diagram illustrating an example of image data generated by the recognition unit 122 according to the embodiment of the present disclosure. FIG. 14 is a diagram illustrating a recognition result obtained by the recognition unit 122 according to the embodiment of the present disclosure.

As described above, the recognition unit 122 acquires the event detection data for a constant period. The recognition unit 122 replaces the event type information included in the acquired event detection data with color information. For example, the recognition unit 122 replaces the pixel in which the positive event has been detected with a green pixel (indicated by oblique lines from the upper right to the lower left in FIG. 13), and replaces the pixel in which the negative event has been detected with a red pixel (indicated by oblique lines from the upper left to the lower right in FIG. 13). In addition, pixels for which no event has been detected are replaced with blue pixels (indicated in white in FIG. 13). The color indicating the event is not limited to green, red, or blue. Other colors may be used as long as detection/non-detection of an event and positive/negative of an event can be distinguished.

In addition, the recognition unit 122 replaces the time information included in the event detection data with the luminance information. The recognition unit 122 replaces the luminance value of each pixel so as to allow the pixel in which the event is detected at the end timing of the constant period to have a lowest luminance and allow the pixel in which the event is detected at the start timing to have a highest luminance. Note that the luminance of the pixel in which the event has not been detected can be a constant value.

In this manner, the recognition unit 122 represents each pixel with the luminance value according to the time difference of the event detection timing, making it possible to include the information regarding the time in the input to the trained model.

For example, in a case where the detection device 20 has detected a moving ball, an image used as an input to the trained model by the recognition unit 122 includes a red point group having a shape close to a semicircle and a green point group having a shape close to a semicircle as illustrated in FIG. 13. In each point group, the color becomes thicker in the traveling direction of the ball (the left side in FIG. 13), and the color becomes thinner in the direction opposite to the traveling direction.

For example, the recognition unit 122 recognizes the position, shape, motion vector, and the like of the ball as illustrated in FIG. 14 by using the image illustrated in FIG. 13 as an input to the trained model.

The recognition unit 122 outputs the recognition result to the detection unit 123 and the generation unit 124.

Here, the recognition unit 122 performs recognition by using the trained model using the event detection data for a constant period as an input, but the input is not limited thereto. For example, the recognition unit 122 may use a constant number of pieces of event detection data instead of a constant period, as the input. In this case, the acquisition unit 121 goes back from the time (hereinafter, also referred to as designated time) designated by the detection unit 123, and outputs a constant number of pieces of event detection data to the recognition unit 122.

In addition, the learning accuracy and efficiency change according to the speed range and the complexity of the shape of the object as a detection target, the surrounding environment, and the like. Therefore, the period (constant period) and the number (constant number) of the event detection data received by the recognition unit 122 from the acquisition unit 121 can be appropriately adjusted according to the speed range and the complexity of shape of the object as a detection target (here, a tennis ball), the surrounding environment, and the like.

In this case, for example, the recognition unit 122 may generate a group of pixels close to each other based on the event detection data sequentially input so as to go back from the designated time, and may perform the recognition processing by the learning in a case where the number of pixels included in the group becomes a predetermined value or more. In this manner, the event detection data output from the acquisition unit 121 to the recognition unit 122 is not limited to a constant period or a constant number of pieces of data.

Furthermore, for example, the recognition unit 122 may perform pre-processing before recognition by machine learning, such as not performing recognition processing in a case where the object included in the generated image is clearly different from the detection target. For example, in a case where it is clear that the detection target is not included in the generated image, for example, in a case where the generated image includes a vertically long object such as a player while the detection target is a tennis ball, the recognition unit 122 can omit the recognition processing.

In the above example, the recognition unit 122 recognizes the speed and the motion vector by machine learning, but the operation is not limited thereto. The recognition unit 122 need not recognize the speed and the motion vector by machine learning. In this case, for example, the recognition unit 122 can estimate the speed and the motion vector from the position change of the recognized object based on the event detection data in different periods.

(Detection Unit 123)

The detection unit 123 detects a generation timing of an image to be presented to the user based on a recognition result obtained by the recognition unit 122. For example, in the case of video judgment in tennis, the detection unit 123 detects the timing at which the ball touches the ground as the generation timing of the image to be presented to the user. In other words, the detection unit 123 detects the timing at which the object (ball) is positioned at (touches) a predetermined place (ground). In this case, the detection unit 123 detects the timing at which the direction of the motion vector of the recognized object is reversed as the generation timing.

Figure 15:
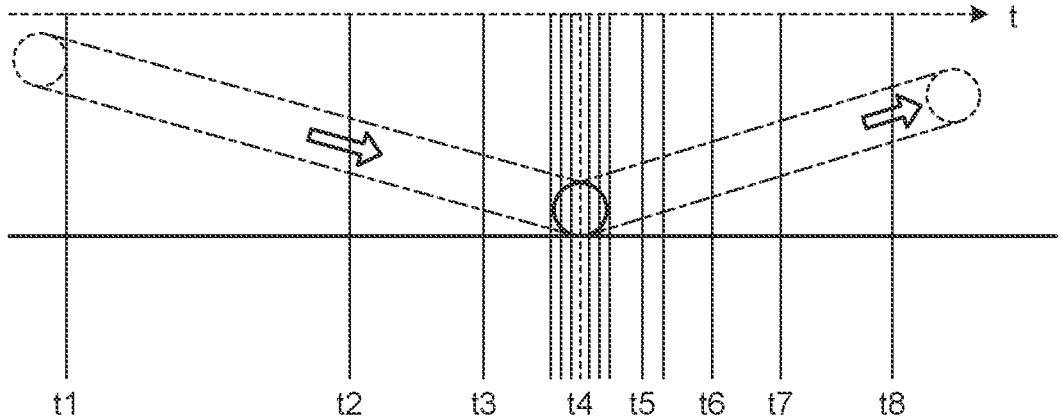
FIG. 15 is a diagram illustrating detection of a generation timing performed by a detection unit according to the embodiment of the present disclosure.

FIG. 15 is a diagram illustrating detection of a generation timing performed by the detection unit 123 according to the embodiment of the present disclosure.

First, by instructing the acquisition unit 121 that time t1, being a certain time, is defined as the designated time, the detection unit 123 acquires, from the recognition unit 122, information related to the position and the motion vector of the object (here, the ball) at time t1. In the example of FIG. 15, the detection unit 123 detects a downward motion vector V1.

Next, with time t2 later than time t1 defined as the designated time, the detection unit 123 acquires the position and a motion vector V2 of the object at time t2. Here, it is assumed that the motion vector V2 acquired by the detection unit 123 is a vector having the same direction as the motion vector V1 at time t1 and having a smaller size than the motion vector V1.

Next, with time t8 later than time t2 defined as the designated time, the detection unit 123 acquires the position and a motion vector V3 of the object at time t8. Here, it is assumed that the motion vector V3 acquired by the detection unit 123 is upward, which is a direction opposite to the motion vector V2 at time t2.

In this case, the ball is considered to have touched the ground and bounded between time t2 and time t8. Therefore, with time t5, which is a time before time t8 and between time t2 and time t8, defined as the designated time, the detection unit 123 acquires the position of the object and a motion vector V4 at time t5.

Moreover, with time t3 between time t2 and time t5 defined as the designated time, the detection unit 123 acquires the position of the object and a motion vector V5 at time t3. With time t7 between time t5 and time t8 defined as the designated time, the detection unit 123 acquires the position of the object and a motion vector V6 at time t7.

The detection unit 123 compares the positions of the objects at times t3, t5, and t7, and detects the time of the lowest position. For example, in FIG. 15, the position of the object at time t5 is the lowest.

In this case, with time t4 between time t3 and time t5 as the designated time, the detection unit 123 acquires the position and a motion vector V7 of the object at time t4. With time t6 between time t5 and time t7 defined as the designated time, the detection unit 123 acquires the position of the object and a motion vector V8 at time t6.

The detection unit 123 compares the positions of the objects at times t4, t5, and t6, and detects the time of the lowest position. For example, in FIG. 15, the position of the object at time t5 is the lowest. Similarly, the detection unit 123 compares the positions of the objects while narrowing the time interval, and detects the time at the lowest position. The detection unit 123 determines the detected time as the generation timing. In the example of FIG. 15, the detection unit 123 determines time t5 indicated by a dotted line as the generation timing.

(Generation Unit 124)

The generation unit 124 generates an output image at the generation timing detected by the detection unit 123. For example, by combining an image related to an object (here, a ball) with image data (background) at a time closest to the generation timing, the generation unit 124 generates an output image. Alternatively, the generation unit 124 can generate an output image by combining an image related to an object with a background image acquired in advance. The combining position and the size of the image related to the object are determined based on the recognition result obtained by the recognition unit 122.

Here, the image related to the object is a contour image of the object or an image generated from three-dimensional CG. The generation unit 124 may combine the image by using an image of the object acquired in advance, or using an object image clipped from the image data acquired from the detection device 20. Alternatively, the image related to the object may be an image generated by the recognition unit 122 based on the event detection data. Furthermore, the generation unit 124 may use a plurality of images for combining an image. For example, the generation unit 124 may combine both the image generated by the recognition unit 122 based on the event detection data and the contour image of the object to generate the output image.

In this manner, the generation unit 124 combines the image generated based on the event detection data to obtain the output image, making it possible for the control device 10 to present a more convincing output image to the user.

Further, the generation unit 124 may generate an output video including the output image at the generation timing. The output video is a moving image in a predetermined period including a generation timing.

The generation unit 124 generates a plurality of output images in a predetermined period, and joins the plurality of output images to generates the output video. Alternatively, the generation unit 124 interpolates images between frames of image data acquired from the detection device 20 to generates an output image.

At this time, for example, a generation unit 124 may generate the output video such that the time interval becomes narrowest before and after the generation timing in the predetermined period, and the time interval becomes widest near the start and end of the predetermined period. That is, a generation unit 124 generates the output video such that the output video is reproduced in slow motion before and after the generation timing, for example.

In this manner, the frame rate of the output video generated by a generation unit 124 may be set to be variable in the output video. Note that such a frame rate may be a value designated by the user, or may be a value set in advance according to the operating environment of the system or the like.

(Output Control Unit 125)

The output control unit 125 presents the output image or the output video to the user by outputting the output image or the output video generated by the generation unit 124 to a display device (not illustrated) via the I/F unit 110.

3. Information Processing

Next, an example of information processing by the information processing system 1 according to the embodiment of the present disclosure will be described.

<3.1. Setting Processing>

Figure 16:
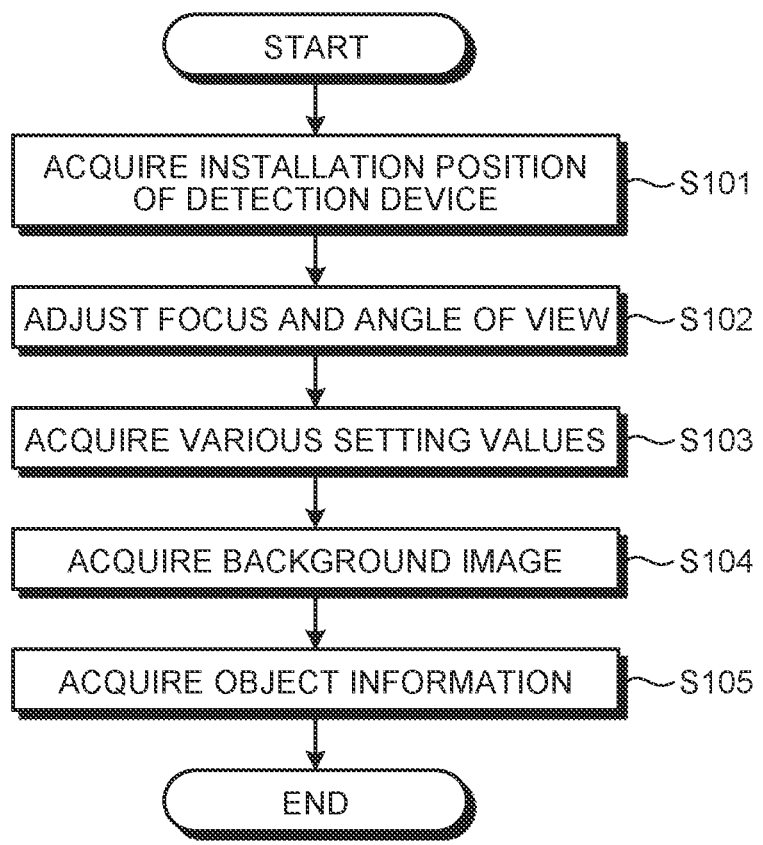
FIG. 16 is a flowchart illustrating an example of a flow of setting processing executed by the information processing system according to the embodiment of the present disclosure.

First, setting processing by the information processing system 1 according to the embodiment of the present disclosure will be described with reference to FIG. 16. FIG. 16 is a flowchart illustrating an example of a flow of setting processing executed by the information processing system 1 according to the embodiment of the present disclosure. The information processing system 1 executes setting processing at the start of system operation. The setting processing is mainly executed by the control unit 120 of the control device 10 of the information processing system 1.

As illustrated in FIG. 16, the control device 10 acquires an installation position of the detection device 20 (Step S101). The control device 10 acquires the installation position from an administrator who operates the system. Alternatively, control device 10 may acquire the installation position from a positioning sensor such as a global positioning system (GPS) sensor (not illustrated) grounded to the detection device 20.

The control device 10 controls the detection device 20 to adjust the focus and angle of view of the EVS 220 and the image sensor 240 (Step S102). For example, the control device 10 adjusts the focus and the angle of view to be the same in the EVS 220 and the image sensor 240. The focus and the angle of view may be adjusted manually.

Next, the control device 10 acquires various setting values such as the line position on the ground, the size of the ball as a detection target, and the distance to the ground (Step S103). The various setting values are values that vary depending on an object to be detected, a timing to be detected, an environment, and the like. The control device 10 uses the setting values to adjust the trained model, for example.

The control device 10 acquires a background image as a background of the output image (Step S104). For example, the control device 10 acquires a still image acquired by the image sensor 240 of the detection device 20 as a background image. Alternatively, the control device 10 may acquire, as the background image, a captured image captured in advance, such as an image captured by another device, or an image generated by CG or the like. For example, in a case where a background image other than the image data captured by the image sensor 240 is acquired, the control device 10 may calibrate the acquired background image and the angle of view of the EVS 220 with each other.

The control device 10 acquires object information to be used for generating an image related to an object (Step S105). An example of the object information is information indicating a three-dimensional shape of the object (here, a ball) or image information of the object. The control device 10 generates an output image by combining a two-dimensional object image generated based on the object information in image generation processing to be described below with a background image.

In a case where the control device 10 uses image data captured by the image sensor 240 as the background image, the acquisition of the background image in Step S104 may be omitted. Furthermore, in a case where the control device 10 combines the object image included in the image data captured by the image sensor 240 or the image generated by the recognition unit 122 with the background image to generate the output image, the acquisition of the object information in Step S105 may be omitted.

<3.2. Imaging Processing>

Figure 17:
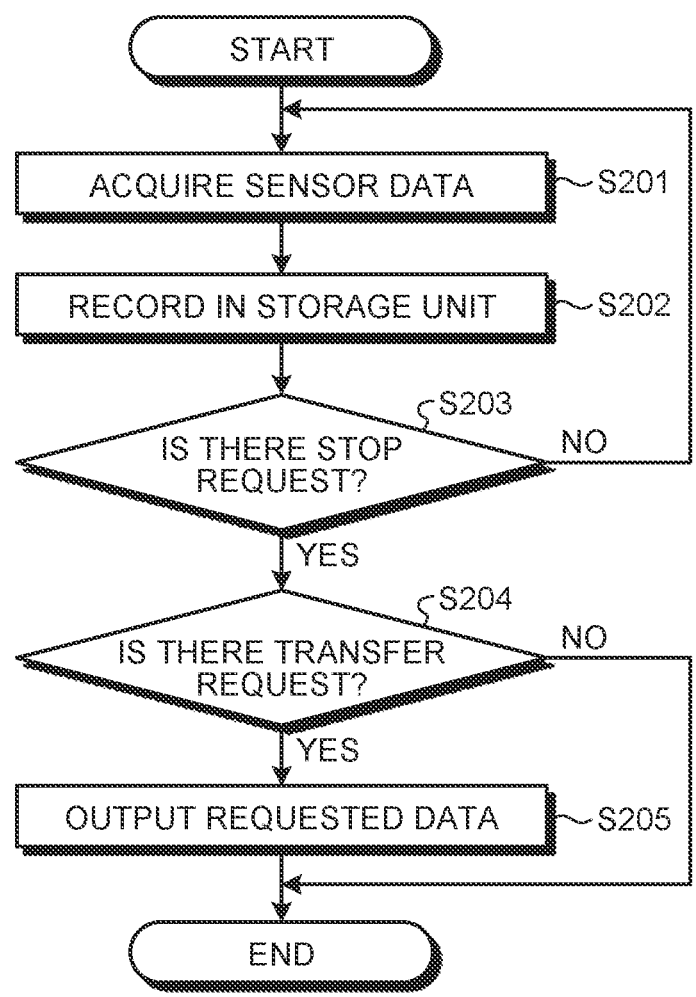
FIG. 17 is a flowchart illustrating an example of a flow of imaging processing executed by the information processing system according to the embodiment of the present disclosure.

Next, imaging processing performed by the information processing system 1 according to the embodiment of the present disclosure will be described with reference to FIG. 17. FIG. 17 is a flowchart illustrating an example of a flow of imaging processing executed by the information processing system 1 according to the embodiment of the present disclosure. The imaging processing is executed by the detection device 20 in accordance with an instruction from the control device 10 of the information processing system 1. When having received an operation start instruction from the control device 10, the detection device 20 executes imaging processing illustrated in FIG. 17.

The detection device 20 acquires sensor data (Step S201). The sensor data includes event detection data output by the EVS 220 and image data output by the image sensor 240. The detection device 20 stores the acquired sensor data in the storage unit 260 (Step S202).

The detection device 20 judges whether there is an imaging stop request from the control device 10 (Step S203). When there is no stop request (Step S203; No), the detection device 20 returns to Step S201.

In contrast, when there is a stop request (Step S203; Yes), the detection device 20 judges whether there is a data transfer request (Step S204). When there is no transfer request (Step S204; No), the detection device 20 ends the imaging processing.

In contrast, when there is a transfer request (Step S204; Yes), the detection device 20 outputs requested data which is sensor data for a period requested by the control device 10 (Step S205).

<3.3. Generation Processing>

Figure 18:
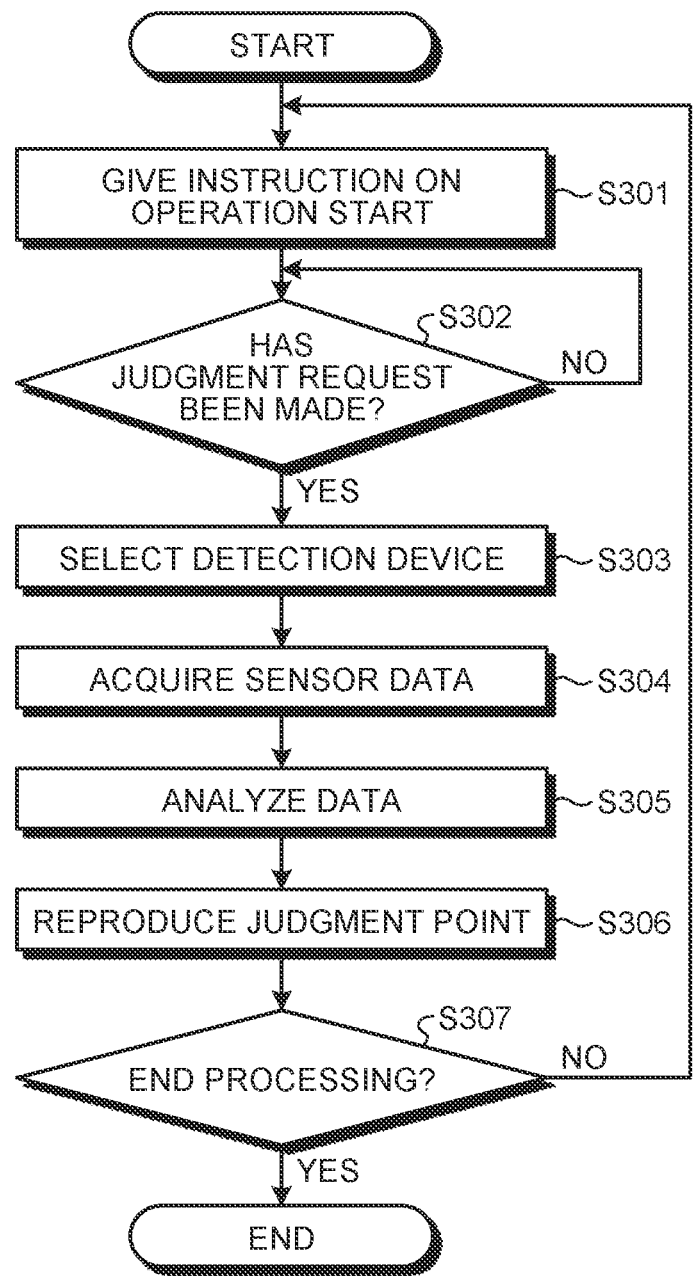
FIG. 18 is a flowchart illustrating an example of a flow of generation processing executed by the information processing system according to the embodiment of the present disclosure.

An output image generation processing performed by the information processing system 1 according to the embodiment of the present disclosure will be described with reference to FIG. 18. FIG. 18 is a flowchart illustrating an example of a flow of generation processing executed by the information processing system 1 according to the embodiment of the present disclosure. The generation processing is executed by the control device 10 of the information processing system 1. The control device 10 executes the generation processing until there is an end instruction from the user.

The control device 10 instructs the detection device 20 to start an operation (Step S301). With this instruction, the detection device 20 executes imaging processing and acquires sensor data.

Next, the control device 10 judges whether a judgment request has been made by the user (Step S302). The judgment request here is a request for video judgment from the user, and is a request for outputting an output image at a desired timing.

In a case where there is no judgment request from the user (Step S302; No), the control device 10 returns to Step S302 and waits for a judgment request. In contrast, in a case where there is a judgment request from the user (Step S302; Yes), the detection device 20 to be the target in generating the output image is selected according to the instruction from the user (Step S303). Alternatively, based on the image data captured by the image sensors 240 of the plurality of detection devices 20, the control device 10 may select the detection device 20 by specifying the detection device 20 that has captured the object as a detection target near the time instructed by the user.

The control device 10 acquires sensor data from the selected detection device 20 (Step S304). The control device 10 analyzes the acquired data (Step S305). More specifically, the control device 10 recognizes a ball, which is a detection target, from the event detection data, and detects the timing of generating the output image. The control device 10 generates an output video of a judgment point including the detected timing and outputs the output video to a display device (not illustrated), thereby reproducing the judgment point (Step S306).

After reproducing the judgment point, the control device 10 judges whether to end the processing (Step S307). When having received an instruction to end the processing from the user, the control device 10 judges to end the generation processing (Step S307; Yes) and ends the generation processing. In contrast, when having no instruction to end the processing from the user, or having received an instruction to continue the processing from the user, the control device 10 judges not to end the generation processing (Step S307; No), and returns to Step S301.

4. Other Embodiments

The above-described embodiment is an example, and various modifications and applications are possible.

In the above-described embodiment, the information processing system 1 is used for video judgment of tennis, but application is not limited thereto. The information processing system 1 according to the embodiment of the present disclosure can be applied to video judgment in sports other than tennis such as volleyball, a collision experiment of a moving body such as a car, for example.

Alternatively, the information processing system 1 may be applied to goal judgment of athletics or horse racing. In this case, the control device 10 detects the generation timing according to whether the object has crossed a predetermined position (for example, a goal line) instead of detecting the timing of generating the output image from the motion vector of the object.

Figure 19:
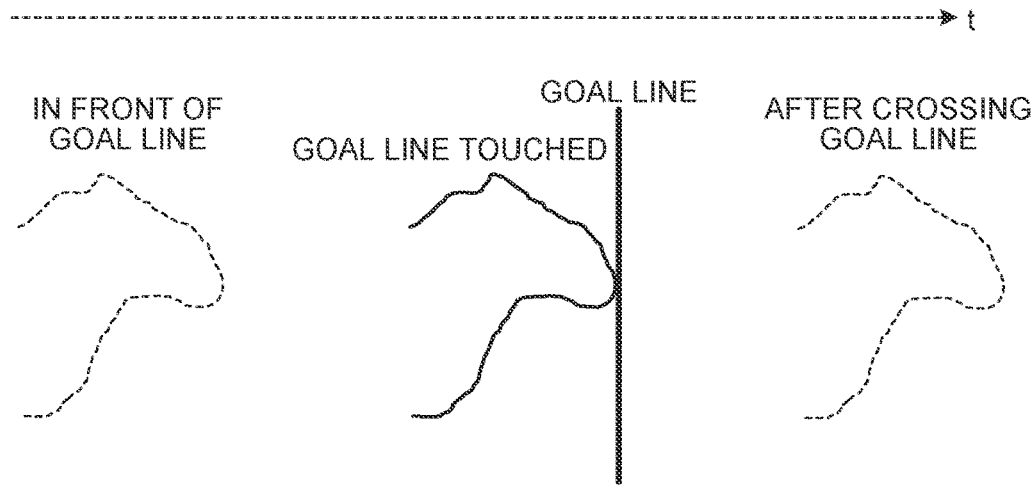
FIG. 19 is a diagram for describing another application example of the information processing system according to the embodiment of the present disclosure.

Hereinafter, a case where the information processing system 1 is applied to goal judgment of a horse race will be described as an example. FIG. 19 is a diagram for describing another application example of the information processing system 1 according to the embodiment of the present disclosure.

For example, at the time of calibration in the setting processing, the control device 10 sets the position to be the goal on the angle of view in units of pixels. In the generation processing, the control device 10 generates an output video with the timing at which the contour of the recognized object touched the set goal line as a judgment point.

In the goal judgment in horse racing and athletics, the object as a detection target is a horse or a person. Therefore, due to a complicated shape of the object, there may be a case where a part of the shape is detected without the entire object entering the angle of view. Even in a case where a part of the object is detected as described above, the control device 10 is supposed to pre-adjust the trained model so as to more accurately recognize the contour of the moving object.

Note that the method of searching for the timing at which the contour of the object touched the goal line can be similar to the case of searching for the timing at which the ball touched the ground described above. That is, the control device 10 can detect the timing at which the contour of the object touched the goal line by recognizing the position of the object while shifting the time.

Alternatively, by predicting the time of crossing the goal from the size of the recognized motion vector and the speed of the object, and comparing the position of the object before and after the prediction time with the goal line, the control device 10 can further reduce the convergence time, that is, the search time.

Furthermore, the application example of the information processing system 1 according to the above-described embodiment is not limited to the video judgment and the goal judgment. For example, the information processing system 1 can be applied to an analysis system of a Pachinko game machine. For example, the information processing system 1 analyzes a contact point between pins and a ball of a Pachinko game table and a track of the ball. At this time, the information processing system 1 can detect both the change timing of the motion vector of the ball and the contact timing between the ball and the pin as the generation timing.

The information processing system 1 performs track analysis of the balls in the pachinko game machine by performing super slow reproduction centered on the contact timing between the pin and the ball or plotting the trajectory of the ball.

Since the information processing system 1 detects an object using the EVS 220, it is possible to store data for a longer time and to reduce the analysis time as compared with a high-speed camera (high frame rate camera).

Although the above embodiment has described that the detection device 20 includes the image sensor 240, but application is not limited thereto. In a case where the control device 10 generates the output image without using the captured image of the image sensor 240, such as a case where a background image captured in advance is used or a case where a CG image is used as the background image, the detection device 20 does not have to be equipped with the image sensor 240.

This enables further downsizing of the detection device 20, leading to an improved degree of freedom in arrangement of the detection device 20. In addition, the image data of the image sensor 240 need not be stored, making it possible to further reduce the volume of data to be stored in the storage unit 260.

5. Hardware Configuration

Figure 20:
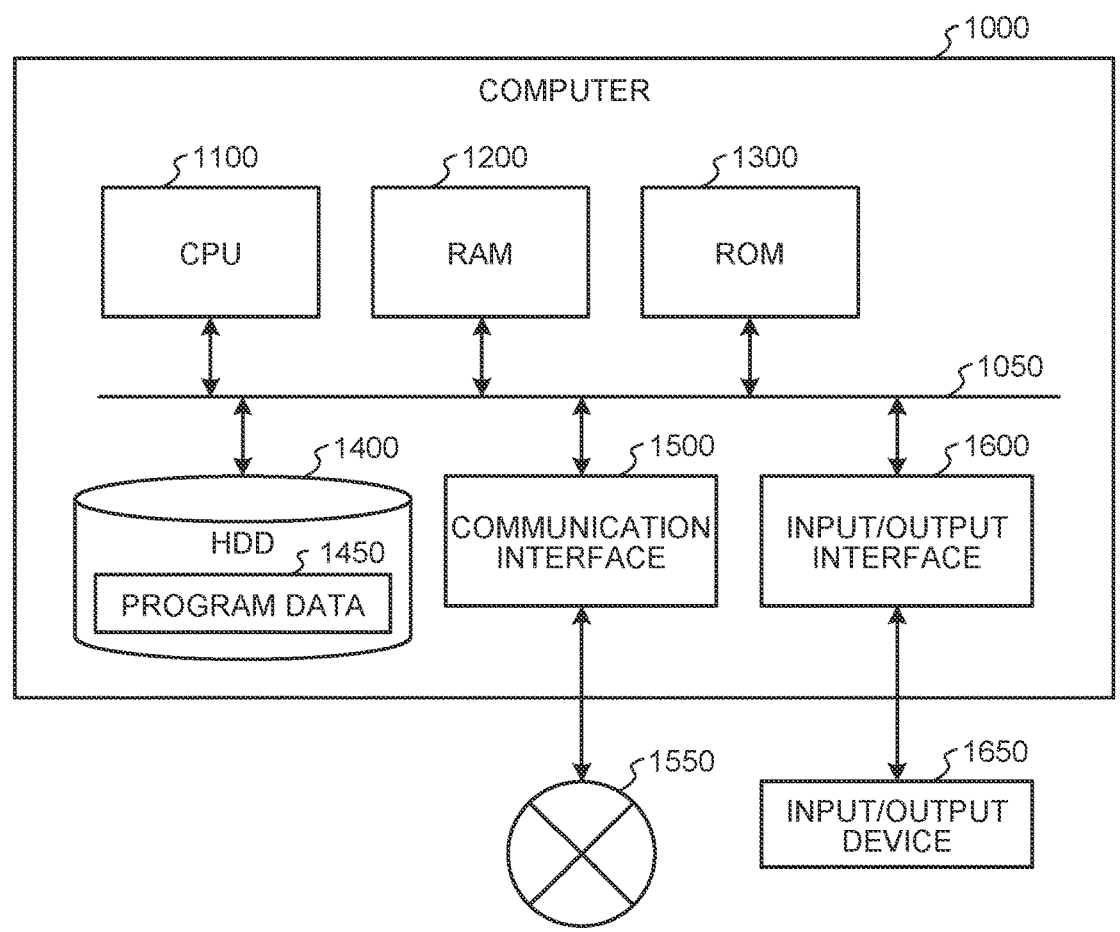
FIG. 20 is a hardware configuration diagram illustrating an example of a computer that implements functions of a control device.

An information processing device 100 according to the above-described embodiment is implemented by a computer 1000 having a configuration as illustrated in FIG. 20, for example. FIG. 20 is a hardware configuration diagram illustrating an example of the computer 1000 that implements functions of the control device 10. The computer 1000 includes a CPU 1100, RAM 1200, ROM 1300, storage 1400, a communication interface 1500, and an input/output interface 1600. Individual components of the computer 1000 are interconnected by a bus 1050.

The CPU 1100 operates on the basis of a program stored in the ROM 1300 or the storage 1400 so as to control each component. For example, the CPU 1100 develops a program stored in the ROM 1300 or the storage 1400 in the RAM 1200, and executes processing corresponding to various programs.

The ROM 1300 stores a boot program such as a basic input output system (BIOS) executed by the CPU 1100 when the computer 1000 starts up, a program dependent on hardware of the computer 1000, or the like.

The storage 1400 is a non-transitory computer-readable recording medium that records a program executed by the CPU 1100, data used by the program, or the like. Specifically, the storage 1400 is a recording medium that records a program according to the present disclosure which is an example of a program data 1450.

The communication interface 1500 is an interface for connecting the computer 1000 to an external network 1550. For example, the CPU 1100 receives data from other devices or transmits data generated by the CPU 1100 to other devices via the communication interface 1500.

The input/output interface 1600 is an interface for connecting an input/output device 1650 with the computer 1000. For example, the CPU 1100 can receive data from an input device such as a keyboard, a mouse, and an acceleration sensor 13 via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on a predetermined recording medium. Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the control device 10 according to the embodiment, the CPU 1100 of the computer 1000 executes the information processing program loaded on the RAM 1200 so as to implement the functions of the control unit 120 or the like. In addition, the storage 1400 stores a program according to the present disclosure and data in the storage unit 130. While the CPU 1100 executes program data 1450 read from the storage 1400, the CPU 1100 may acquire these programs from another device via the external network 1550, as another example.

6. Summary

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Among the processing described in the above embodiments, all or a part of the processing described as being performed automatically may be manually performed, or the processing described as being performed manually can be performed automatically by known methods. In addition, the processing procedures, specific names, and information including various data and parameters illustrated in the above Literatures or drawings can be arbitrarily altered unless otherwise specified. For example, a variety of information illustrated in each of the drawings are not limited to the information illustrated.

In addition, each of components of each device is provided as a functional and conceptional illustration and thus does not necessarily need to be physically configured as illustrated. That is, the specific form of distribution/integration of each of the devices is not limited to those illustrated in the drawings, and all or a part thereof may be functionally or physically distributed or integrated into arbitrary units according to various loads and use situations.

Furthermore, the above-described embodiments can be appropriately combined within a range implementable without contradiction of processes.

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

Note that the following configurations also belong to the technical scope of the present disclosure.

(1)
An information processing device comprising:
an acquisition unit that acquires information including event data and a detection time of the event data associated with each other, the event data being data output from a first sensor including a pixel array unit, the pixel array unit having a plurality of pixels arranged in a two-dimensional lattice pattern, each of the pixels configured to detect a luminance change in incident light and output event data;
a recognition unit that recognizes an object detected by the first sensor by using a trained model using information related to the detection time and the event data as an input; and
an output unit that outputs an image related to the recognized object.

(2)
The information processing device according to (1),
wherein the recognition unit sets, as the input to the trained model, an input image in which information aindicating whether luminance included in the event data has changed to positive or negative with respect to a threshold is set as color information, and in which difference information between a reference time and the detection time is set as luminance information.

(3)
The information processing device according to (1) or (2),
wherein the acquisition unit acquires frame image data from a second sensor that captures a frame image, and
the output unit outputs a combined image obtained by combining an object image related to the object with the frame image data.

(4)
The information processing device according to (3),
wherein the object image is an illustrative image of the object.

(5)
The information processing device according to (3),
wherein the object image is an image in which information indicating whether luminance included in the event data has changed to positive or negative with respect to a threshold is set as color information and in which difference information between a reference time and the detection time is set as luminance information.

(6)
The information processing device according to any one of (1) to (5), further comprising
a detection unit that detects a timing at which the object is positioned at a predetermined location based on movement information of the object,
wherein the output unit outputs the image related to the object at the timing.

(7)
The information processing device according to (6),
wherein the output unit outputs a plurality of frame images in a period including the timing, the plurality of frame images including the image related to the object.

(8)
The information processing device according to (7),
wherein the output unit outputs the plurality of frame images having different frame rates.

(9)
An information processing system comprising:
a first sensor including a pixel array unit, the pixel array unit having a plurality of pixels arranged in a two-dimensional lattice pattern, each of the pixels configured to detect a luminance change in incident light and output event data; and an information processing device,
wherein the information processing device includes:
an acquisition unit that acquires information including the event data output from the first sensor and a detection time of the event data associated with each other;
a recognition unit that recognizes an object detected by the first sensor by using a trained model using information related to the detection time and the event data as an input; and
an output unit that outputs an image related to the recognized object.

(10)
An information processing method comprising:
acquiring information including event data and a detection time of the event data associated with each other, the event data being data output from a first sensor including a pixel array unit, the pixel array unit having a plurality of pixels arranged in a two-dimensional lattice pattern, each of the pixels configured to detect a luminance change in incident light and output event data;
recognizing an object detected by the first sensor by using a trained model using information related to the detection time and the event data as an input; and outputting an image related to the recognized object.

(11)
A program for causing a computer to function as:
an acquisition unit that acquires information including event data and a detection time of the event data associated with each other, the event data being data output from a first sensor including a pixel array unit, the pixel array unit having a plurality of pixels arranged in a two-dimensional lattice pattern, each of the pixels configured to detect a luminance change in incident light and output event data;
a recognition unit that recognizes an object detected by the first sensor by using a trained model using information related to the detection time and the event data as an input; and
an output unit that outputs an image related to the recognized object.

REFERENCE SIGNS LIST

1 INFORMATION PROCESSING SYSTEM
10 CONTROL DEVICE
20 DETECTION DEVICE
110 I/F UNIT
120 CONTROL UNIT
121 ACQUISITION UNIT
122 RECOGNITION UNIT
123 DETECTION UNIT
124 GENERATION UNIT
125 OUTPUT CONTROL UNIT

The invention claimed is:
1. An information processing device comprising:
a memory storing a program, and
at least one processor configured to execute the program to perform operations comprising:
acquiring information including event data and a detection time of the event data associated with each other, the event data being data output from a first sensor including a pixel array unit, the pixel array unit having a plurality of pixels arranged in a two-dimensional lattice pattern, each of the pixels configured to detect a luminance change in incident light and output event data;
recognizing an object detected by the first sensor by using a trained model using information related to the detection time and the event data as an input; and
outputting an image related to the recognized object,
acquiring frame image data from a second sensor that captures a frame image; and
generating a reconstructed image of a desired timing obtained by combining an illustrative image of the object with the frame image data.

2. The information processing device according to claim 1, wherein the operations further comprise:
setting, as the input to the trained model, an input image in which information indicating whether luminance included in the event data has changed to positive or negative with respect to a threshold is set as color information, and
setting, as luminance information, difference information between a reference time and the detection time.

3. The information processing device according to claim 1, wherein the object image is an image in which information indicating whether luminance included in the event data has changed to positive or negative with respect to a threshold is set as color information and in which difference information between a reference time and the detection time is set as luminance information.

4. The information processing device according to claim 1, wherein the operations further comprise:
detecting a timing at which the object is positioned at a predetermined location based on movement information of the object, and
outputting the image related to the object at the timing.

5. The information processing device according to claim 4, wherein the operations further comprise:
outputting a plurality of frame images in a period including the timing, the plurality of frame images including the image related to the object.

6. The information processing device according to claim 5, wherein the operations further comprise:
outputting the plurality of frame images having different frame rates.

7. An information processing system comprising:
a first sensor including a pixel array unit, the pixel array unit having a plurality of pixels arranged in a two-dimensional lattice pattern, each of the pixels configured to detect a luminance change in incident light and output event data; and
an information processing device,
wherein the information processing device includes:
a memory storing a program, and
at least one processor configured to execute the program to perform operations comprising:
acquiring information including the event data output from the first sensor and a detection time of the event data associated with each other;
recognizing an object detected by the first sensor by using a trained model using information related to the detection time and the event data as an input; and
outputting an image related to the recognized object,
wherein acquiring information including the event data output from the first sensor and a detection time of the event data associated with each other includes acquiring frame image data from a second sensor that captures a frame image, and
outputting an image related to the recognized object comprises generating a reconstructed image of a desired timing obtained by combining an illustrative image of the object with the frame image data.

8. An information processing method comprising:
acquiring information including event data and a detection time of the event data associated with each other, the event data being data output from a first sensor including a pixel array unit, the pixel array unit having a plurality of pixels arranged in a two-dimensional lattice pattern, each of the pixels configured to detect a luminance change in incident light and output event data;
acquiring frame image data from a second sensor that captures a frame image, recognizing an object detected by the first sensor by using a trained model using information related to the detection time and the event data as an input; and
outputting an image related to the recognized object,
wherein the image related to the recognized object is a reconstructed image of a desired timing obtained by combining an illustrative image of the object with the frame image data.

9. The method of claim 8, wherein the method further comprises:
setting, as the input to the trained model, an input image in which information indicating whether luminance included in the event data has changed to positive or negative with respect to a threshold is set as color information, and
setting, as luminance information, difference information between a reference time and the detection time.

10. The method of claim 8, wherein the method further comprises:
detecting a timing at which the object is positioned at a predetermined location based on movement information of the object, and
outputting the image related to the object at the timing.

11. The method of claim 10, wherein the method further comprises:
outputting a plurality of frame images in a period including the timing, the plurality of frame images including the image related to the object.

12. The method of claim 11, wherein the method further comprises:
outputting the plurality of frame images having different frame rates.

13. A non-transitory computer readable medium storing a program for causing an information processing device to perform a set of operations comprising:
acquiring information including event data and a detection time of the event data associated with each other, the event data being data output from a first sensor including a pixel array unit, the pixel array unit having a plurality of pixels arranged in a two-dimensional lattice pattern, each of the pixels configured to detect a luminance change in incident light and output event data;
recognizing an object detected by the first sensor by using a trained model using information related to the detection time and the event data as an input; and
outputting an image related to the recognized object,
wherein acquiring information including event data and a detection time of the event data associated with each other comprises acquiring frame image data from a second sensor that captures a frame image, and
wherein outputting an image related to the recognized object comprises generating a reconstructed image of a desired timing obtained by combining an illustrative image of the object with the frame image data.

14. The non-transitory computer readable medium of claim 13, wherein the operations further comprise:
setting, as the input to the trained model, an input image in which information indicating whether luminance included in the event data has changed to positive or negative with respect to a threshold is set as color information, and
setting, as luminance information, difference information between a reference time and the detection time.

15. The non-transitory computer readable medium of claim 13, wherein the operations further comprise:
detecting a timing at which the object is positioned at a predetermined location based on movement information of the object, and
outputting the image related to the object at the timing.

16. The non-transitory computer readable medium of claim 15, wherein the operations further comprise:
outputting a plurality of frame images in a period including the timing, the plurality of frame images including the image related to the object.

17. The non-transitory computer readable medium of claim 16, wherein the operations further comprise:
outputting the plurality of frame images having different frame rates.

* * * * *